(12) United States Patent
Nakatsuka

(10) Patent No.: US 10,261,307 B2
(45) Date of Patent: Apr. 16, 2019

(54) MICROSCOPE SYSTEM

(71) Applicant: OLYMPUS CORPORATION, Tokyo (JP)

(72) Inventor: Masayuki Nakatsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/784,248

(22) Filed: Oct. 16, 2017

(65) Prior Publication Data

US 2018/0106993 A1  Apr. 19, 2018

(30) Foreign Application Priority Data

Oct. 19, 2016 (JP) .................. 2016-205126

(51) Int. Cl.
*G02B 21/36* (2006.01)
*G02B 21/26* (2006.01)
*G02B 21/02* (2006.01)
*H04N 5/232* (2006.01)

(52) U.S. Cl.
CPC ........... *G02B 21/367* (2013.01); *G02B 21/26* (2013.01); *H04N 5/23238* (2013.01); *G02B 21/02* (2013.01)

(58) Field of Classification Search
CPC ...... G02B 21/367; G02B 21/26; G02B 21/02; H04N 5/23238
See application file for complete search history.

(56) References Cited

U.S. PATENT DOCUMENTS

| | | |
|---|---|---|
| 2010/0149362 A1 | 6/2010 | Kang |
| 2010/0171809 A1 | 7/2010 | Fujiyoshi |
| 2011/0141261 A1* | 6/2011 | Oshima ................ G02B 21/367 348/79 |
| 2013/0077892 A1 | 3/2013 | Ikeno et al. |
| 2015/0339822 A1 | 11/2015 | Onda et al. |

FOREIGN PATENT DOCUMENTS

| | | |
|---|---|---|
| EP | 2 947 623 A1 | 11/2015 |
| JP | 2010134374 A | 6/2010 |
| JP | 2011259503 A | 12/2011 |
| JP | 2015-221089 A | 12/2015 |

OTHER PUBLICATIONS

Extended Supplementary European Search Report dated Mar. 29, 2018 in European Patent Application No. 17 19 4959.7.

\* cited by examiner

*Primary Examiner* — Anner N Holder
(74) *Attorney, Agent, or Firm* — Scully, Scott, Murphy & Presser, P.C.

(57) ABSTRACT

Provided is a microscope system including: a stage on which a sample is placed and that is movable in a direction orthogonal to an observation optical axis; a detecting unit that detects a position of the stage; an imaging unit that acquires an image of the sample on the stage; an image generating unit that generates an overlapped image by overlapping the acquired image with the position of the stage; a searching unit that searches for a position of the acquired image in the generated overlapped image; and a control unit that performs control including causing the image generating unit to stop the overlapping process and causing the searching unit to execute the position search when detection by the detecting unit fails, and causing the image generating unit to resume the overlapping process starting from a search position of the searching unit when the search is successful.

5 Claims, 5 Drawing Sheets

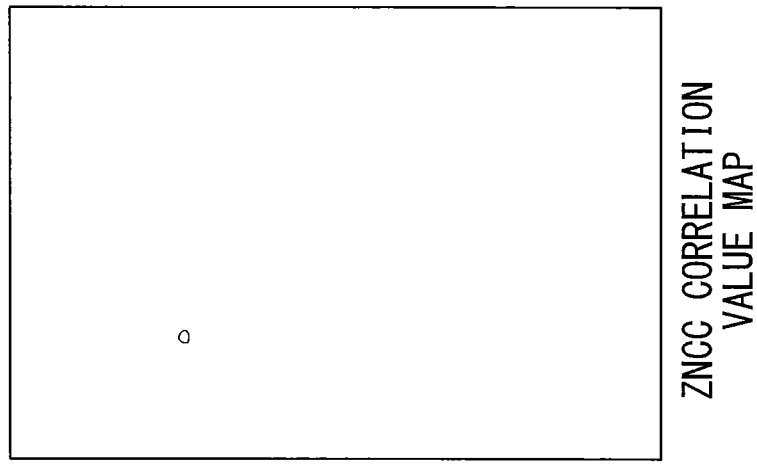
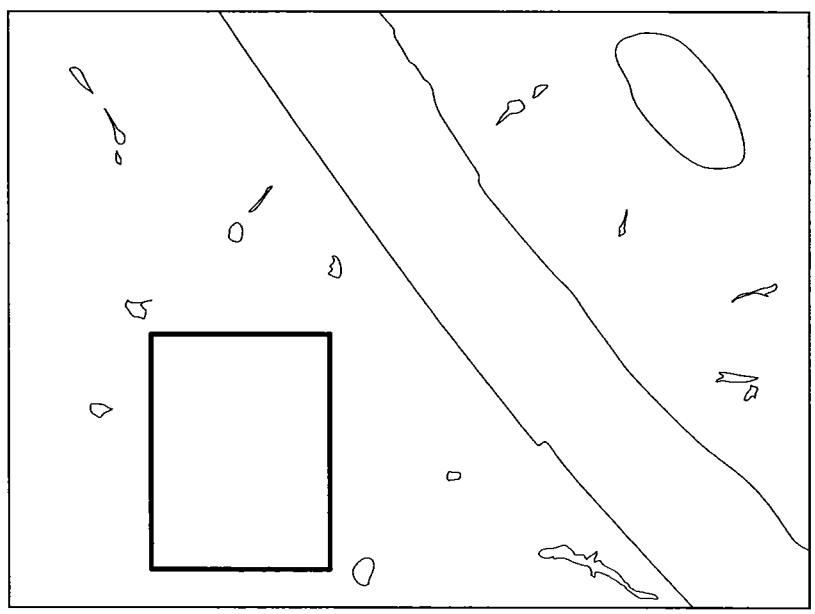

ZNCC CORRELATION VALUE MAP

MICROSCOPE SYSTEM

CROSS-REFERENCE TO RELATED APPLICATIONS

This application claims the benefit of Japanese Patent Application No. 2016-205126, the content of which is incorporated herein by reference.

TECHNICAL FIELD

The present invention relates to microscope systems.

BACKGROUND ART

When observing a sample by using a microscope, the visual field that can be observed at one time is mainly determined by the magnifying power of an objective lens. As the magnifying power of the objective lens increases, the sample can be observed more finely, but the observation range becomes smaller.

For the purpose of, for example, preventing an observation site of the sample from being overlooked, it is demanded that the entire image of the sample and the currently-observed visual field range be ascertained simultaneously. A known microscope system, that is, a so-called virtual slide system, is equipped with an electrically-driven stage or an encoder-equipped stage and generates a wide-field-angle overlapped image by overlapping a plurality of still images acquired while shifting the visual field of the sample (e.g., see Patent Literature 1).

Furthermore, a known imaging system generates an overlapped image by calculating the relative positional relationship between acquired images by performing image processing, such as pattern matching (e.g., see Patent Literature 2).

In such an imaging system, if the relative positional relationship, that is, the stage position, is lost during the overlapping process, the stage position is searched for by calculating the relative positional relationship between the already-generated overlapped image and the newly-acquired image, and the overlapping process resumes when the search is successful.

CITATION LIST

Patent Literature

{PTL 1}
Japanese Unexamined Patent Application, Publication No. 2010-134374
{PTL 2}
Japanese Unexamined Patent Application, Publication No. 2011-259503

SUMMARY OF INVENTION

According to an aspect of the present invention, a microscope system includes: a stage on which a sample is placed and that is movable in a direction orthogonal to an observation optical axis; a position detecting unit that detects a position of the stage; an imaging unit that acquires an image of the sample on the stage; an image generating unit that generates an overlapped image by performing an overlapping process on the image acquired by the imaging unit based on the position of the stage detected by the position detecting unit; a position searching unit that performs a position search to search for a position of the image acquired by the imaging unit in the overlapped image generated by the image generating unit; and a control unit that performs control including causing the image generating unit to stop the overlapping process and causing the position searching unit to execute the position search when detection by the position detecting unit fails, and causing the image generating unit to resume the overlapping process starting from a search position of the position searching unit when the position search by the position searching unit is successful.

BRIEF DESCRIPTION OF DRAWINGS

FIG. 4A illustrates an example of a live image indicated by a rectangular frame in an overlapped image.

FIG. 4B illustrates a correlation value map in a case where there are few sections that resemble the live image in FIG. 4A.

DESCRIPTION OF EMBODIMENTS

A microscope system 1 according to an embodiment of the present invention will be described below with reference to the drawings.

Figure 1:
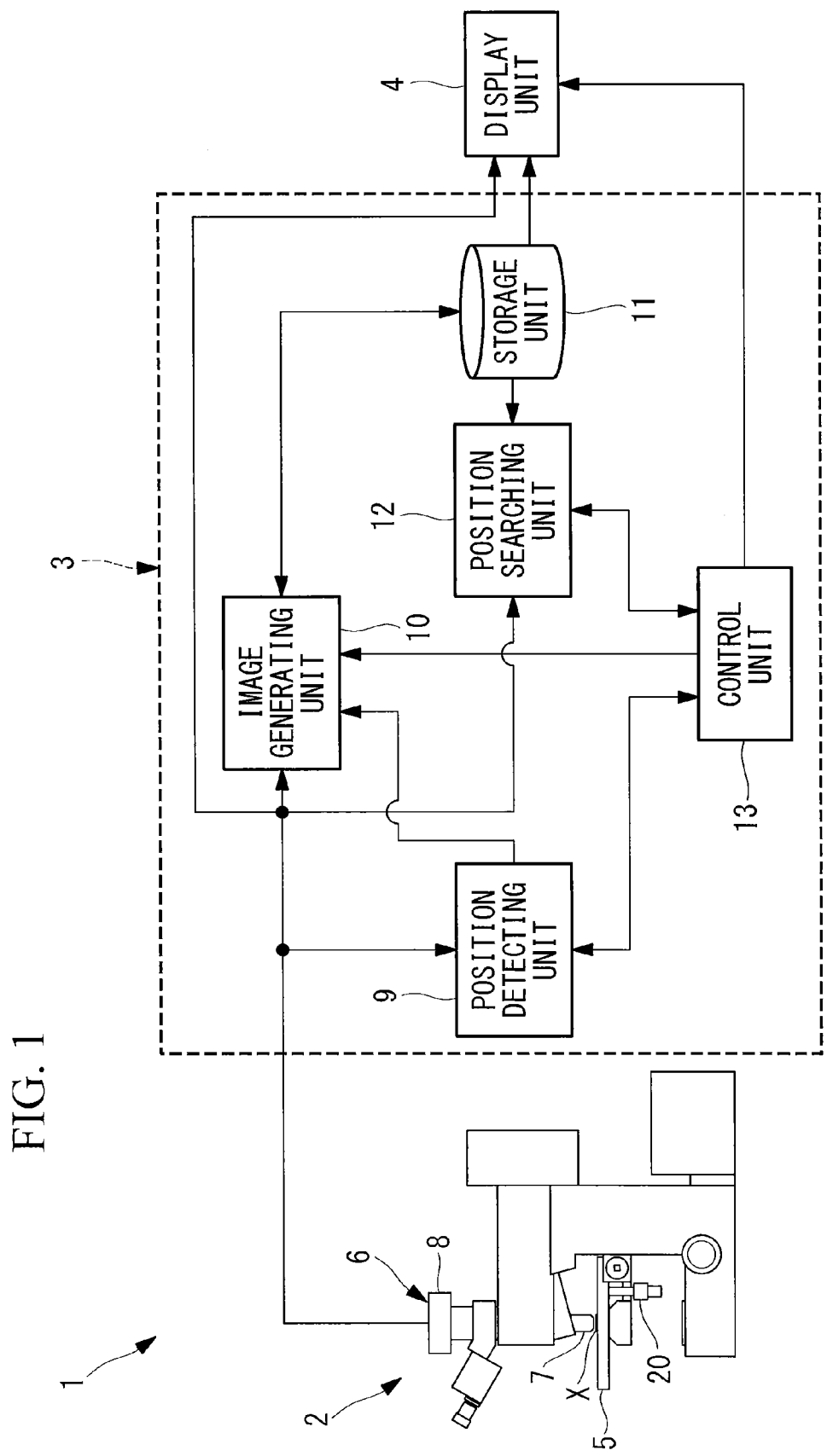
FIG. 1 is a block diagram illustrating a microscope imaging system according to an embodiment of the present invention.

As shown in FIG. 1, the microscope system 1 according to this embodiment includes a microscope 2, an image processing unit 3 that processes an image acquired by the microscope 2, and a display unit (e.g., a liquid crystal display) 4 that displays a composite image generated by the image processing unit 3 and a live image acquired by the microscope 2.

The microscope 2 includes a stage 5 capable of three-dimensionally moving a sample X placed thereon, an imaging unit 6 that acquires an image of the sample X placed on the stage 5, and an objective lens 7 whose observation optical axis is disposed in the vertical direction. The microscope 2 also includes an operable unit 20 to be operated by a user for manually moving the stage 5 in two directions (horizontal directions) orthogonal to the observation optical axis.

The imaging unit 6 includes a camera 8 that acquires an image of light from the sample X collected by the objective lens 7.

The camera 8 acquires a live image by acquiring an image of the sample X at a predetermined frame rate and sends frame images constituting the live image to the image processing unit 3. A live image is a moving image constituted of a plurality of consecutive frame images for display. Alternatively, the camera 8 may send, to the image processing unit 3, a plurality of consecutively-acquired still images.

The image processing unit 3 is a calculator, such as a general-purpose personal computer, a workstation, a built-in processor, a field programmable gate array (FPGA), a digital signal processor (DSP), or a general purpose computing graphic processing unit (GPGPU).

The image processing unit 3 includes: a position detecting unit 9 that detects the stage position from the amount of movement between two newly-acquired consecutive frame images in the time-axis direction, among the images sent from the camera 8; an image generating unit 10 that generates an overlapped image M by sequentially overlapping the images sent from the camera 8; a storage unit 11 that stores the overlapped image M generated by the image generating unit 10; a position searching unit 12 that searches for the position of an image newly sent from the camera 8 in the overlapped image M; and a control unit 13 that controls the display unit 4, the position detecting unit 9, the image generating unit 10, and the position searching unit 12.

The image processing unit 3 sends the live image sent from the camera 8, the overlapped image M stored in the storage unit 11, and the stage position information to the display unit 4. The display unit 4 displays the live image and the overlapped image M, and also displays a rectangular frame F indicating the stage position in the overlapped image M.

The position detecting unit 9 calculates the amount of movement, that is, a motion vector, between two consecutive frame images of the live image sent from the camera 8 and cumulatively adds the calculated motion vector so as to calculate the stage position in the overlapped image M. Moreover, the position detecting unit 9 also calculates the reliability of the calculated stage position.

The motion vector may be calculated using a known method, such as template-matching/block-matching using a sum-of-absolute difference (SAD) or normalized cross-correlation (NCC) as an evaluation function, or phase-only correlation (POC). Moreover, the degree of similarity calculated when performing template matching or POC (the inverse of the degree of dissimilarity for SAD and the degree of correlation for NCC) may be used as the reliability of the calculated stage position.

In response to a command from the control unit 13, the image generating unit 10 generates a new overlapped image M by overlapping the frame image newly sent from the camera 8 with the overlapped image M stored in the storage unit 11 based on the stage position detected by the position detecting unit 9.

The storage unit 11 is a freely-chosen storage device, such as a memory device, a hard disk drive (HDD), or a solid state drive (SSD). When the storage unit 11 receives the new overlapped image M generated by the image generating unit 10, the storage unit 11 updates the overlapped image M stored therein.

The position searching unit 12 executes a position search in response to a command from the control unit 13. For the image position search, a known method, such as template-matching/block-matching using SAD or NCC or POC, can be used, similarly to the calculation of the motion vector by the position detecting unit 9 from the overlapped image M stored in the storage unit 11 using the image obtained from the camera 8 as a template. In this case, a maximum value of the degree of similarity used during the search can be calculated as the reliability.

The operation of the microscope system 1 according to this embodiment having the above-described configuration will be described below.

Figure 2:
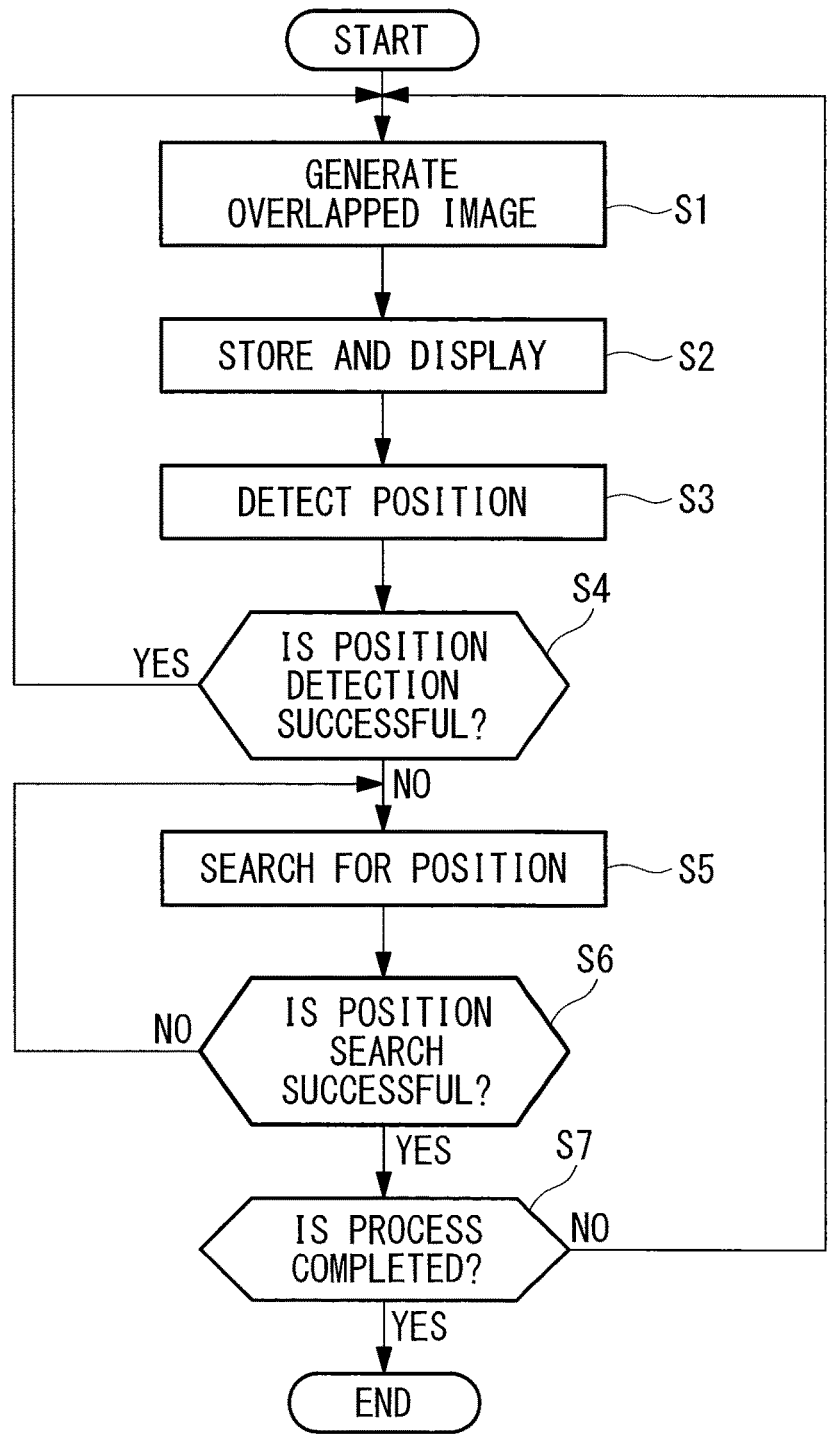
FIG. 2 is a flowchart illustrating a process performed by the microscope imaging system in FIG. 1.
Figure 3:
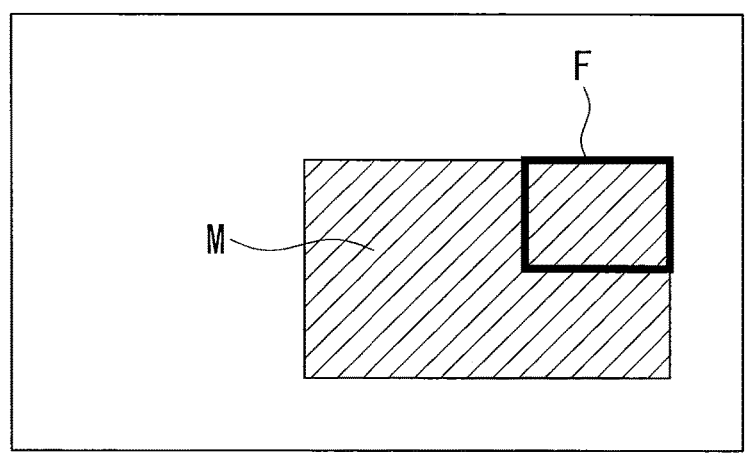
FIG. 3 illustrates an example of an image obtained by combining an overlapped image generated by the microscope imaging system in FIG. 1 with a frame indicating the current position.

As shown in FIG. 2, in order to generate an overlapped image M by using this embodiment, an overlapping process is commenced. Then, an observation image of the sample X first sent from the camera 8 is sent to the image generating unit 10 where a first overlapped image M is generated (step S1). The generated overlapped image M is sent to the storage unit 11 where it is stored, a composite image is generated by combining a frame indicating the current position of the stage 5 with the overlapped image M generated by the image generating unit 10, and the composite image is output to the display unit 4 where it is displayed, as shown in FIG. 3 (step S2).

Subsequently, the stage position is detected by the position detecting unit 9 (step S3), and it is determined whether or not the position detection is successful depending on whether or not the reliability of the calculation result of the position detecting unit 9 exceeds a predetermined threshold value (step S4). If the reliability of the calculation result of the position detecting unit 9 exceeds the predetermined threshold value, the control unit 13 determines that the detection of the stage position is successful and causes the image generating unit 10 to overlap the image sent from the camera 8 with the detected stage position (step S1).

Accordingly, when the user operates the operable unit 20 to move the stage 5, the position of the stage 5 is detected by the position detecting unit 9 at a frame rate, and the process of overlapping the image obtained from the camera 8 with the detected stage position is repeated by the image generating unit 10, so that a wide-field-angle overlapped image M is generated.

If the reliability of the calculation result of the position detecting unit 9 is lower than or equal to the predetermined threshold value, the control unit 13 determines that the position detection has failed, causes the image generating unit 10 to stop the overlapping process, and causes the position searching unit 12 to start a position search (step S5). In this case, the rectangular frame F displayable on the display unit 4 is not displayed so as to notify the user that the position detection has failed. Instead of not displaying the rectangular frame F, another freely-chosen display mode, such as displaying a message, may be employed.

The control unit 13 causes the position searching unit 12 to repeat the position search in step S5 until the reliability of the search result of the position searching unit 12 exceeds a predetermined threshold value (step S6).

When the reliability of the search result of the position searching unit 12 exceeds the predetermined threshold value, it is determined that the position search is successful (step S6), and it is determined whether or not the process is completed (step S7).

If the process is to be continued in step S7, the image generating unit 10 resumes the overlapping process (step S1) starting from the stage position detected by the position searching unit 12, and the rectangular frame F indicating the observation visual field is displayed on the display unit 4. Although the determination of whether or not the overlapping process is completed is performed when the position search is successful, the overlapping process may end at an arbitrary timing at which the user desires to end the overlapping process.

This is advantageous in that a wide-field-angle overlapped image M and a currently-observed visual field range can be simultaneously ascertained without using an electrically-driven stage or an encoder-equipped stage.

In this embodiment, the position searching unit 12 may calculate a possibility of false position detection in addition to the reliability of the position detection. When determining whether the position search in step S6 in FIG. 2 is successful, the control unit 13 may determine that the position search is successful only if the reliability of the position searching unit 12 exceeds a predetermined threshold value (first threshold value) and the possibility of false position detection is below a predetermined threshold value (second threshold value).

A method of detecting false position detection in the position searching unit 12 will be described below with reference to an example in which the position searching unit 12 performs template matching using zero-mean normalized cross-correlation (ZNCC) as an evaluation function.

If an overlapped image has only one section that resembles the composition included in a live image indicated by a rectangular frame in FIG. 4A, a ZNCC correlation value map used when performing template matching has a maximum value corresponding to a sharp peak in an area where the image position matches, as shown in FIG. 4B, and the maximum value is a large value (close to 1 in the case of a correlation value). Therefore, it can be determined that the search is successful in accordance with the determination based on the predetermined threshold value, and even when the overlapping process resumes starting from the position of the search result, the image obtained from the camera 8 can be overlapped with the overlapped image without deviation.

Because the position searching unit 12 uses the maximum value of the degree of similarity used during the position search as the reliability of the search result, if the composition of the live image is not included in the overlapped image, that is, if the live observation visual field is outside the range of the overlapped image, the maximum value of the degree of similarity in template matching becomes smaller (i.e., becomes close to 0 in the case of a correlation value), so that it can be determined that the search has failed based on the predetermined threshold value. As a result, the overlapping process does not resume, so that the overlapped image does not become distorted.

Figure 5B:
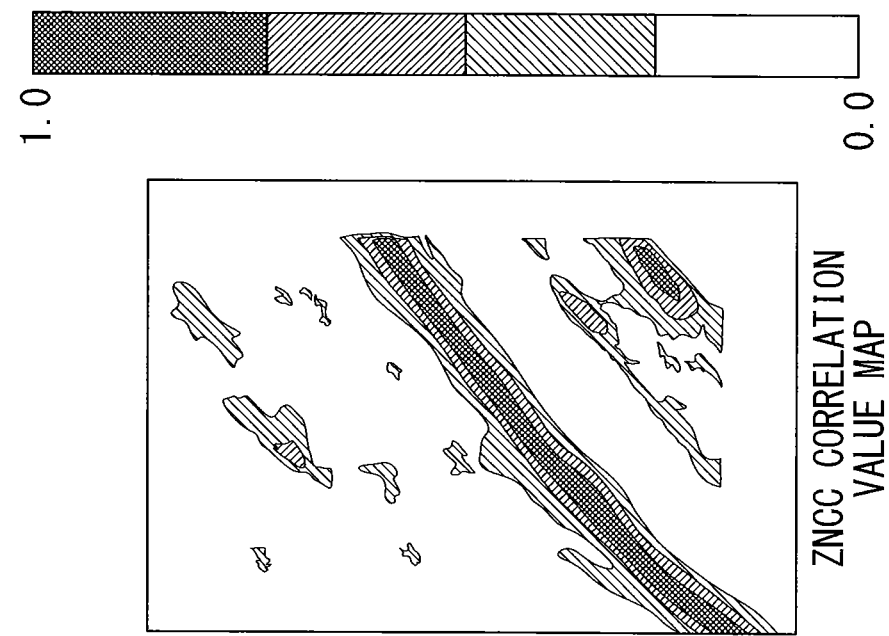
FIG. 5B illustrates a correlation value map in a case where there are many sections that resemble the live image in FIG. 5A.
Figure 5A:
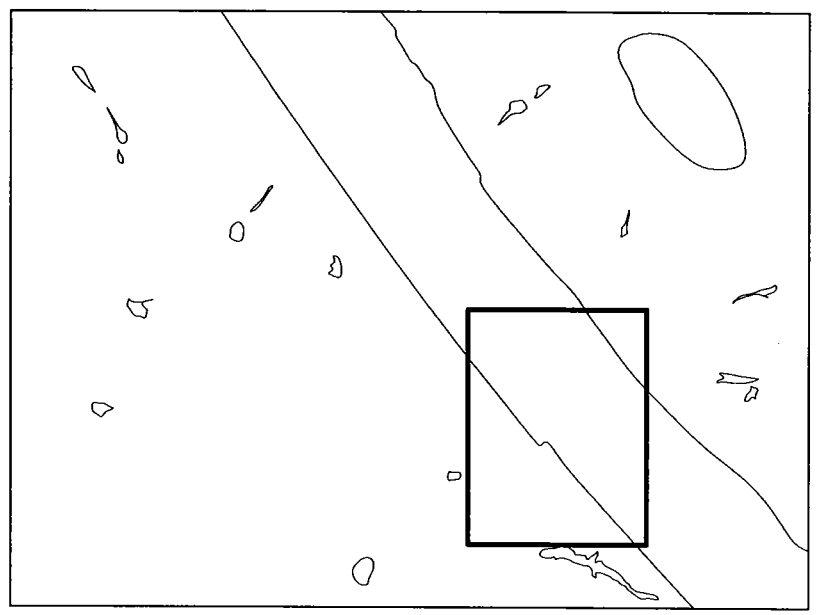
FIG. 5A illustrates an example of a live image indicated by a rectangular frame in an overlapped image.

In contrast, in the case of the composition included in a live image indicated by a rectangular frame in FIG. 5A, the overlapped image has a plurality of similar sections. Therefore, as shown in FIG. 5B, a wide region with a high degree of similarity (degree of correlation) appears on the ZNCC correlation value map when template matching is performed, thus resulting in an increased possibility of the position corresponding to the maximum value of the degree of similarity being a wrong position. When the maximum value of the degree of similarity (reliability) exceeds a predetermined threshold value, it is determined that the search is successful with respect to the wrong position. This results in an increased possibility of resuming the overlapping process starting from the wrong position and distortion of the overlapped image.

In other words, it is possible to calculate a possibility of detection of a wrong position as a search result (i.e. a possibility of false detection) from the distribution of the ZNCC correlation value map. For example, since the ZNCC correlation value map ranges between −1 and 1, the correlation value map may be provided with a predetermined threshold value (e.g., 0.8), and the possibility of false detection can be calculated by:

1. using Su as an indicator for the possibility of false detection, or
2. using the ratio Su/St as an indicator for the possibility of false detection, where Su denotes the number of pixels in the correlation value map that exceed the threshold value, and St denotes the total number of pixels in the correlation value map.

Alternatively, a histogram of the correlation value map may be created, and the possibility of false detection may be calculated from the distribution of the histogram.

For example, a histogram is created after a correlation value is normalized and turned into an integer based on the following expression:

$$ev'=\text{Max}(0,\text{Min}(255,\text{Round}(255.0\times ev/ev_{max})))$$

where ev denotes a ZNCC correlation value, $ev_{max}$ denotes a maximum value of the correlation value in a ZNCC correlation value map, and ev' denotes a correlation value normalized and turned into an unsigned 8-bit integer. Round (x) is a function that rounds off a fractional value x and turns the value into an integer.

Accordingly, a histogram with 256 bins can be created (although the number of bins is 256 as an example, the calculation can be performed with an arbitrary number of bins).

With regard to the calculated histogram, the possibility of false detection can be calculated in accordance with one of the following methods:

1. using a count Su equivalent to N upper-level bins of the histogram as an indicator for the possibility of false detection, and
2. using a ratio R between the count Su equivalent to N upper-level bins of the histogram and a total number of pixels St as an indicator for the possibility of false detection.

Although an example where ZNCC is used for calculating the degree of similarity in this embodiment, SAD or POC may be used as an alternative.

Furthermore, when the overlapped image has a plurality of compositions included in the live image indicated by the rectangular frame and the search performed by the position searching unit 12 fails, the control unit 13 may cause the display unit 4 to display, to the user, a message for changing the composition of the live image so as to prompt the user to move the stage 5. Accordingly, the position searching unit 12 can perform the search on the overlapped image M using the new composition of the live image.

From the above-described embodiment, the following invention is derived.

According to an aspect of the present invention, a microscope system includes: a stage on which a sample is placed and that is movable in a direction orthogonal to an observation optical axis; a position detecting unit that detects a position of the stage; an imaging unit that acquires an image of the sample on the stage; an image generating unit that generates an overlapped image by performing an overlapping process on the image acquired by the imaging unit based on the position of the stage detected by the position detecting unit; a position searching unit that performs a position search to search for a position of the image acquired by the imaging unit in the overlapped image generated by the image generating unit; and a control unit that performs control including causing the image generating unit to stop the overlapping process and causing the position searching unit to execute the position search when detection by the position detecting unit fails, and causing the image generating unit to resume the overlapping process starting from a search position of the position searching unit when the position search by the position searching unit is successful.

According to this aspect, by placing the sample on the stage and using the imaging unit to acquire the image of the sample while using the stage to move the sample in the direction orthogonal to the observation optical axis, the image of the sample is acquired. Every time the image of the sample is acquired, the image generating unit generates an overlapped image by performing the overlapping process on the acquired image based on the position of the stage detected by the position detecting unit.

Every time the position detecting unit performs the detection, the control unit determines whether or not the detection has failed. When the control unit determines that the detection has failed, the control unit causes the image generating unit to stop the overlapping process and causes the position searching unit to execute the position search. Then, the control unit determines whether or not the search performed by the position searching unit is successful. When the control unit determines that the search is successful, the control unit causes the image generating unit to resume the overlapping process, starting from the detected search position.

Accordingly, an image is prevented from being overlapped at a wrong position due to the detection of the image position remaining in a failed state, and the overlapping process resumes only when the search is successful, whereby an appropriate overlapped image can be generated.

In the above aspect, the imaging unit may acquire a plurality of images at a predetermined frame rate, and the position detecting unit may detect the position of the stage in accordance with a cumulative value obtained by cumulating relative positions between the images consecutively acquired by the imaging unit.

Accordingly, the current position of the stage can be calculated based on the image acquired by the imaging unit without using an electrically-driven stage or an encoder-equipped stage.

In the above aspect, the position detecting unit may calculate a reliability of a detection result of the position of the stage, and the control unit may determine that the position detection has failed if the reliability calculated by the position detecting unit is below a predetermined threshold value.

Accordingly, the control unit can readily determine whether or not the position detection has failed based on the reliability of the detection result calculated by the position detecting unit.

In the above aspect, the position searching unit may calculate a reliability of a search result, and the control unit may determine that the position search is successful if the reliability calculated by the position searching unit is above a predetermined threshold value.

Accordingly, the control unit can readily determine whether or not the position search is successful based on the reliability of the search result calculated by the position searching unit.

In the above aspect, the position searching unit may calculate a possibility of false detection of the position of the stage from distribution of a degree-of-similarity map used during the position search, and the control unit may determine that the position search is successful only if the reliability calculated by the position searching unit is above a first predetermined threshold value and if the possibility of false detection calculated by the position searching unit is below a second predetermined threshold value.

Accordingly, when there are many similar regions, the possibility of false detection of a search position increases. Therefore, even when the reliability calculated by the position searching unit is high, it is determined that the position search has failed if the possibility of false detection calculated by the position searching unit is high, thereby preventing the overlapping process from starting from a wrong position.

In the above aspect, the position searching unit may calculate the number of pixels exceeding a predetermined threshold value in the degree-of-similarity map used during the position search and may calculate the number of pixels or a ratio of the number of pixels to the total number of pixels as the possibility of false detection.

Accordingly, in a case where the number of pixels indicating similar regions is comparatively large with respect to the total number of pixels, it can be readily determined that the position search has failed based on the possibility of false detection being high.

In the above aspect, the position searching unit may calculate the possibility of false detection of the position from distribution of a histogram of the degree-of-similarity map used during the position search.

Accordingly, it can be readily determined from the distribution of the histogram whether or not the number of pixels indicating similar regions is comparatively large with respect to the total number of pixels, thereby more reliably preventing the overlapping process from resuming in a state where the possibility of false detection is high.

REFERENCE SIGNS LIST 1 microscope system
5 stage
6 imaging unit
9 position detecting unit
10 image generating unit
12 position searching unit
13 control unit
M overlapped image
X sample

The invention claimed is:

1. A microscope system comprising:
    a stage on which a sample is placed and that is movable in a direction orthogonal to an observation optical axis;
    a camera configured to acquire an image of the sample on the stage; and
    a processor comprising hardware, the processor configured to:
    detect a position of the stage;
    generate an overlapped image by performing an overlapping process on the image acquired by the camera based on the detected position of the stage;
    perform a position search to search for a position of the image acquired by the camera in the overlapped image;
    perform a control including stopping the overlapping process and executing the position search when detection of the position of the stage fails, and resuming the overlapping process starting from a search position that is searched when the position search is successful,
    calculate a reliability of a search result and calculate a possibility of a false detection of the position of the stage from a distribution of a degree-of-similarity map used during the position search, and
    determine that the position search is successful if both the reliability is above a first predetermined threshold value and the possibility of false detection is below a second predetermined threshold value.

2. The microscope system according to claim 1,
    wherein the camera is configured to acquire a plurality of images at a predetermined frame rate, and
    wherein the processor is further configured to detect the position of the stage in accordance with a cumulative value obtained by cumulating relative positions between the images consecutively acquired by the camera.

3. The microscope system according to claim 1,
wherein the processor is further configured to:
calculate a reliability of a detection result of the position of the stage, and
determine that the position detection has failed if the reliability that is calculated is below a predetermined threshold value.

4. The microscope system according to claim 1,
wherein the processor is further configured to:
calculate the number of pixels exceeding a predetermined threshold value in the degree-of-similarity map used during the position search and
calculate the number of pixels or a ratio of the number of pixels to the total number of pixels as the possibility of false detection.

5. The microscope system according to claim 1,
wherein the processor is further configured to calculate the possibility of false detection of the position from a distribution of a histogram of the degree-of-similarity map used during the position search.

* * * * *